Nov. 24, 1959

W. HONOLKA 2,914,613

MEANS FOR SECRET TRANSMISSION OF TELEPHONIC AND RADIO MESSAGES

Filed July 18, 1956

INVENTOR.

Walter Honolka 2,914,613

MEANS FOR SECRET TRANSMISSION OF TELEPHONIC AND RADIO MESSAGES

Walter Honolka, Stuttgart, Germany, assignor to Firma Bölkow Entwicklungen Kommanditgesellschaft, Stuttgart, Germany Application July 18, 1956, Serial No. 598,652

Claims priority, application Germany July 23, 1955

9 Claims. (Cl. 179—1.5)

Figures 1, 2:
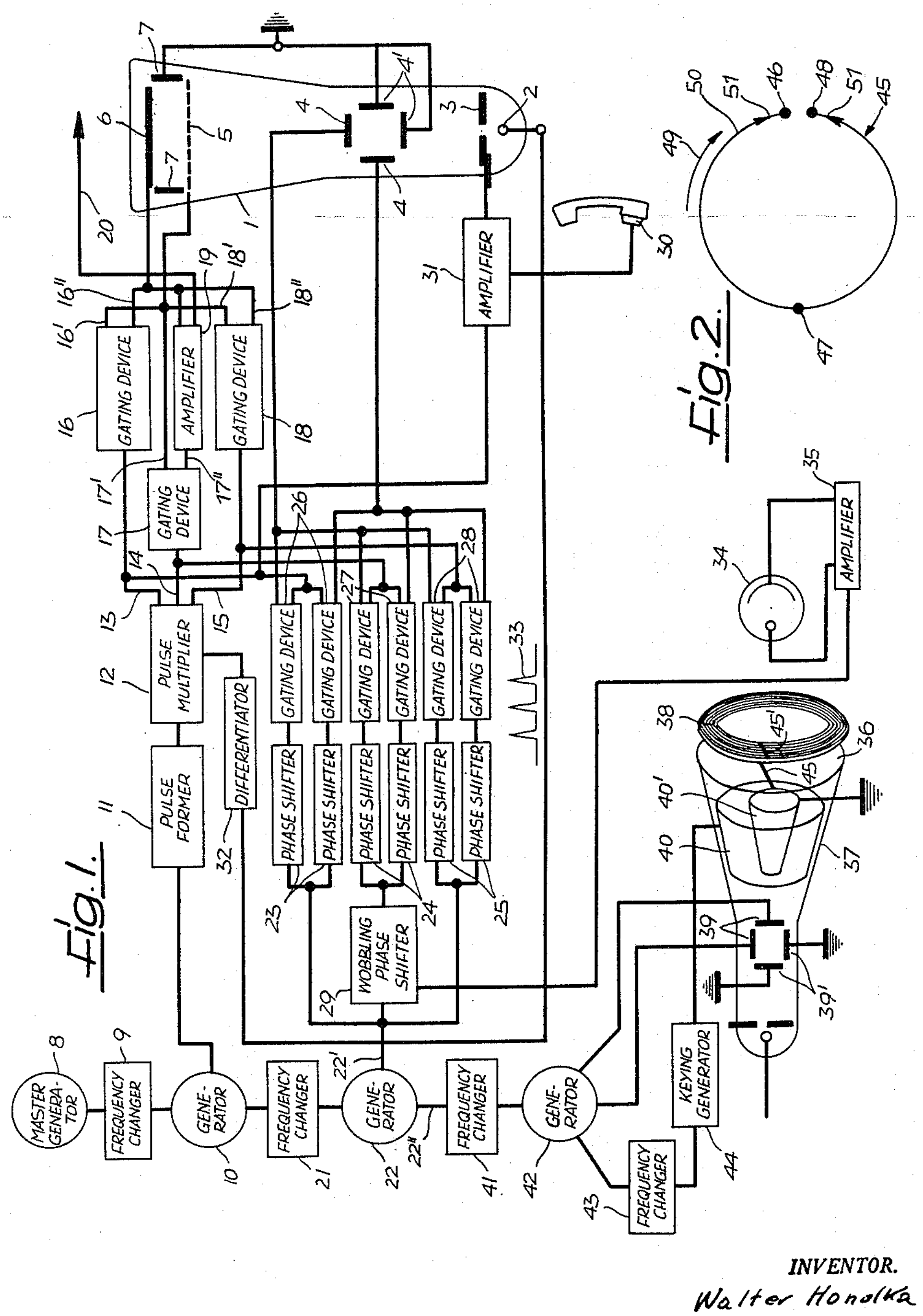

The present invention relates to a method of and means for coding and decoding messages for use in connection with telephonic and/or radio transmission of speech or other signals.

It has already been proposed, in order to provide secrecy during the transmission of telephonic or wireless messages, to store or record a message to be transmitted upon a transmitting magnetic record carrier by means of a recording head and to subsequently reproduce the stored message by means of a wobbling recording or pick-up head controlled by a coding signal in order to produce a distorted or scrambled message. The scrambled signal is transmitted through a wire or radio link and re-recorded at the receiver upon a further magnetic record carrier by means of a recording head operated synchronously with the reproducing head at the transmitter, such as to store or record an unscrambled or decoded message upon the receiving record carrier. The recorded message is then repoduced in the odinary manner to produce a final clear or undistorted signal.

Known methods of this type have the disadvantage among others, that great difficulties are experienced in producing synchronous oscillating or reciprocating movement of the recording and reproducing devices, respectively. A further drawback is due to the effect of inertial forces as a result of the use of mechanically moving elements or devices. Furthermore, since the wobbling heads on both stations must be operated synchronously, exacting precision requirements must be fulfilled as to the mechanical synchronism control at both the transmitting and receiving stations.

An important object of the present invention is, therefore, to substantially avoid the above and related difficulties. This is achieved essentially by an improved scrambling and unscrambling method, whereby a message to be transmitted is recorded by means of a recording or "read-in" radiant energy beam upon the screen of a transmitting image storage tube and subsequently reproduced from the record track upon the screen of the tube by means of a "read-out" beam moved at a speed different from the speed of the read-in beam, in such a manner as to produce a coded or scrambled signal being transmitted to a receiving station either through wires or a wireless transmission link. The received scrambled signals at the receiver are, in turn, recorded by means of read-in beam upon the screen of a similar receiving image storage tube, whereby now the read-in beam is moved or wobbled synchronously with the read-out beam at the transmitter, in such a manner as to produce a clear or unscrambled record of the received message upon the screen of the tube. This recorded message is then reproduced in the ordinary fashion by a "read-out" beam moving at constant speed to restore the original clear and intelligent signal or message. The recording and reproducing beams may be of any suitable type, such as in the form of light beams or, preferably, in the form of cathode ray or electron beams, the latter having the advantage that they may be accurately and efficiently controlled and deflected by purely electrical means.

A major advantage of the invention, among others, is therefore the fact that the scrambling and unscrambling of the message is effected without the use of mechanical moving parts or devices. Since the control of the electron beams is purely electrical, high accuracy and stability of the transmission may be achieved by means of a relatively simple device and by a limited amount of parts and apparatus.

More specifically, in carrying the invention into effect, the read-in cathode ray beam of the transmitter and the read-out beam of the receiver are controlled such as to scan the sound tracks of the transmitting and receiving tubes at equal and constant speeds, whereas the scanning speeds of the read-out beam at the transmitter and the scanning speed of the read-in beam at the receiver are varied in synchronism with each other according to a prearranged coding key or scrambling signal. The beams advantageously describe a circular record or storage track upon the screen of the image storage tube, whereby furthermore the sound track upon the screen of the transmitting tube is removed by an erasing beam leading or being immediately ahead of the recording or read-in beam and the sound track upon the screen of the receiving storage tube is removed by an erasing beam leading or immediately following the recording or read-out beam. In this manner, a relatively short and closed, preferably circular, recording track may be utilized upon both screens of the cathode ray devices.

The voltages for the control of the scanning speed of the wobbling read-out beam at the transmitter and of the wobbling read-in beam of the receiver may be supplied by any suitable source of scrambling or coding signals. According to a preferred embodiment the scrambling signal is produced by means of a photoelectric cell excited by a scanning light spot moving along a stationary scrambling record carrier, such as in the form of a photographic slide or transparency representing a coding signal track. The scanning light spot may be advantageously produced by a rotating electron beam upon the luminescent screen of a further cathode ray tube, in the manner of a flying spot scanner as described in further detail hereafter.

According to one embodiment of the invention, a multiple-gun storage tube may be provided at both the transmitter and the receiver, each of said tubes comprising means for producing three separate electron beams and deflecting and control means to cause said beams to rotate upon the same circular track upon the storage screen of the tube, the first of said beams serving as a read-in beam moving at constant speed along said track (in case of the transmitter), the second beam serving as the read-out beam following said first beam at a predetermined distance and the third beam serving as the erasing beam following the latter beam. At the transmitter, the first and third beams move at the same and constant speed and at a close distance from each other, while the second or read-out beam oscillates about an average speed to produce a scrambled output signal. A similar storage tube is provided at the receiver, whereby however, in order to unscramble the received signal, the first or read-in beam is now oscillated synchronously with the movement of the read-out beam at the transmitter, in order to unscramble the received signal and to provide a clear and intelligent message by the subsequent reproduction by the read-out beam of the receiving tube moving at a speed equal to the speed of the read-in beam at the transmitter. In the receiving tube, the erasing beam advantageously moves closely ahead of the read-out beam, to provide a maximum wobbling range for the read-in beam corresponding to the wobbling range of the read-out beam of the transmitter.

In place of a triple-gun storage tube of the type aforedescribed, a preferred embodiment of the invention, as described in detail hereafter with reference to the drawings, utilizes an image storage tube having a single cathode ray beam controlled by suitable deflecting and control potentials so as to function as read-in, read-out and erasing beam, respectively, during successive time intervals and in cyclic sequence, in the manner of a signal sampling or time division multiplex signal transmission or control system.

The invention also relates to arrangements and a system for the coding and decoding of messages for telephonic and wireless transmission using the secrecy or scrambling method described hereinabove. For this purpose, an image storage tube is provided at both the transmitter and the receiver for the recording and subsequent reproduction of the original and received messages, respectively. The synchronous operation of the transmitting and receiving storage tubes may be effected or controlled advantageously by the use of a master generator or oscillator at each station, exact synchronism between both generators being achieved or maintained in any suitable manner, such as by means of synchronizing signals or pulses, in a manner well known in facsimile, television and related synchronous transmission and/or control systems. In a preferred embodiment of the invention the cyclic control of the image storage tube is effected by the provision of a pulse multiplier connected to the master generator and, in turn, controlling a number of switching devices or gating amplifiers. The outputs of the gating amplifiers are connected to the electrodes of the image storage tube, in such a manner that the electron beam of the latter successively and cyclically functions as a read-in, read-out and erasing beam, respectively. In this manner, a tube having a single electron beam may be used, in the manner more clearly described in and understood from the following.

By the use of a constant control frequency, such as supplied by a crystal controlled master oscillator at both the transmitter and receiver, accurate phase synchronism between the transmitting and receiving cathode ray devices may be insured positively and reliably.

The invention, as to its further objects and novel aspects, will be better understood by the following detailed description of a practical embodiment thereof, taken in reference to the accompanying drawing forming part of this specification and wherein:

Fig. 1 is a block diagram of a speech or other signal scrambling system constructed in accordance with the principles of the invention; and Fig. 2 is a diagram showing the relation between the read-in, read-out and erasing beams upon the storage or recording screens of Fig. 1.

Referring more particularly to Fig. 1, the numeral 1 represents a conventional screen storage tube comprising a cathode or source of electrons 2, in front of which is arranged a perforated electrode 3 for the control or focusing of the electron beam, in a manner well known to those skilled in the art. The tube further comprises two pairs of electrostatic deflecting plates 4—4' for controlling the deflection of the electron beam. The screen of the tube consists of a fine mesh wire net 5 to the intersection points of which on the side opposite to the cathode are applied beads of insulating material in which are embedded small metal particles. Electrostatic storage tubes of this type are well known, and accordingly, further details have been omitted from the drawings and description. Behind the screen 5 as viewed from the cathode is arranged an electron collecting electrode 6, while the space included by the screen 5 and the electrode 6 is electrostatically screened by a cylindrical annular conductor or metal shield 7.

The deflection of the electron beam is controlled by a constant frequency master generator 8 which is preferably in the form of a crystal-controlled oscillator or the like, to insure a constant frequency of the oscillations over extended time periods. Such a constant frequency oscillator greatly facilitates the maintenance of the synchronism between the transmitting generator and the corresponding generator at the receiver by means of suitable control or synchronizing signals or pulses, in accordance with conventional and well known synchronizing methods.

As a practical example, the master generator 8 may produce an oscillation having a frequency of about 100 kc. Connected to the generator 8 is a frequency changer or step-down transformer 9 of any suitable type, such as a heterodyne frequency changer, frequency divider, etc., said frequency transformer controlling in turn a further generator or oscillator 10 producing, by way of example, an oscillation having a frequency of 7 kc., in such a manner as to maintain a constant mutual time phase position between the oscillation of the generator 10 and the oscillation of the master oscillator 8. The oscillations produced by the generator 10 are applied by way of a pulse former 11, which in known manner converts the oscillations into rectangular pulses, to a pulse multiplier 12. The latter converts each input pulse into three successive pulses each of which is applied to a different output lead or circuit 13, 14 and 15, respectively. There are produced in this manner groups of pulses distributed upon different circuits and following each other in cyclic sequence at a group repetition frequency of 7 kc. according to the example mentioned. Each of the outputs 13, 14 and 15 of the pulse multiplier 12 is connected to a switching or gating amplifier 16, 17 and 18, respectively, whose output leads 16' and 16'', 17' and 17'', and 18' and 18'' are each, in turn, connected to the screen 5 and to the collector 6 of the image storage tube 1, in such a manner that each of the gating amplifiers upon being controlled by a pulse of the group produced by the pulse multiplier 12 controls the electric potentials of the screen 5 and the collector 6 of the tube, and in turn, the function of the electron beam as read-in, read-out and erasing beam, respectively, in the manner further understood from the following.

More specifically, in the example illustrated in the drawing, the gating amplifier 16 applies such potentials to the electrodes 5 and 6 of the tube 1, as to cause charging of the insulating beads of the screen 5 in accordance with the instantaneous intensity of the electron beam. This function will be referred to in the following as "read-in" function and the beam referred to as the read-in beam. Similarly, the gating amplifier 17 applies to the electrodes 5 and 6 potentials such that the tube 1 operates in the manner of an ordinary grid-controlled amplifier, whereby the screen 5 corresponds to the grid and the collector 6 corresponds to the anode of the amplifier. As a result of the different charge of the metal particles at the different points of the screen 4, the electron beam will be controlled, in such a manner that a corresponding variable output voltage appears between the collector 6 and the cathode 2 of the tube. This output voltage is amplified by means of an amplifier connected between the output 17'' of the gating amplifier 17 and the collector 6. The amplified output signal voltage is applied to a suitable transmitter by way of the conductor 20, which transmitter may be either a telephone transmitter or a radio transmitter for the transmission of the scrambled message to a distant receiving station. The function of the electron beam in producing output signals from the previously stored message and applied to the transmitter will be referred to hereafter as the "read-out" function and this beam referred to as read-out beam. Finally, by the effect of the gating amplifier 18, the potentials at the electrodes 5 and 6 are controlled such as to cause the electron beam to remove the charge from the metallic particles, this function being referred to in the following as "erasing" function and the beam being referred to as erasing beam.

The output of the generator 10 is further applied by way of a frequency step-down transformer 21 to a generator or oscillator 22 producing, for instance, an oscillation of 4 cycles in the example given hereinabove. Again, the generator 22 is controlled by the frequency changer 21 in such a manner that the instantaneous phase positions of the oscillations of the generator 22 remain substantially constant relative to the phase of the oscillations of the generator 10, that is, in turn, that the phase of the oscillations of the generator 22 is maintained at a constant relation to the phase of the oscillations of the master generator 8. One of the outputs 22' of the generator 22 is applied to three different pairs of phase displacing devices 23, 24 and 25 whose outputs are each in turn applied to the deflecting plates 4 of the storage tube 1 by way of corresponding pairs of further switching or gating amplifiers 26, 27 and 28, respectively. The remaining deflecting plates 4' of the tube are connected to ground or any other reference potential point of the system to which is also connected the screen 7. The pairs of gating devices 26, 27 and 28 are furthermore each connected to an output 12, 13 and 15, respectively, of the pulse multiplier 12. These gating devices serve to apply to the plates 4 the voltages supplied by the phase shifters 23, 24 and 25 during the time periods during which the corresponding pair of gating devices 26, 27 and 28 is controlled by a pulse supplied by the pulse multiplier 12. Since the pulse supplied by the output 13 of the multiplier 12 causes the beam of tube 1 to act as read-in beam, the position of the electron beam during the recording period will be determined by the pair of phase shifters 23. Similarly, the phase shifter pair 24 controlled by the output 14 of the pulse multiplier 12 determines the position of the beam during the read-out period and, finally, the phase shifter pair 25 controlled by the output 15 of the pulse multiplier 12 determines the position of the beam during the erasing period of the record track.

The phase shifter pair 24 for the control of the beam during the read-out period is preceded by a wobbling or scrambling phase shifter 29 which may be controlled by any suitable source of scrambling signals or potentials, such as described in greater detail hereafter. The relative adjustment of the phases of the deflecting voltages to cause the beam to rotate along a preferably circular recording track can be effected in accordance with well known practice, that is, both with regard to the relative phase of the two deflecting voltages effecting the rotation of the beam and with regard to their instantaneous time phase position to cause the beam to change between its read-in, its read-out and its erasing positions, respectively.

In order to modulate the electron beam during the read-in period, there is shown an amplifier 31 controlled by a microphone 30, the output voltage of said amplifier being applied to the electrode 3 of the tube 1 serving as a control electrode. The input of the amplifier is furthermore controlled by the output of the pulse multiplier 12, in such a manner that control or modulation of the electron beams is effected only during the periods when the amplifier 31 is gated by a pulse occurring in the output of the mutliplier 12. In this manner, the beam is modulated only during the actual duration while it acts as recording or read-in beam. The cathode 2 of the tube is furthermore shown connected to a differentiator 32 energized from a further output of the pulse multiplier 12. As a result, there are produced short blocking pulses 33 by the differentiator 32, which serve to block the beam during the periods of transition from read-in to read-out to erasing position, respectively.

In the example shown, the wobbling phase shifter 29, in the example shown, is controlled by a photoelectric cell 34 by way of an amplifier 35. The photoelectric cell is excited by a rotating light spot scanning the screen 36 of a further cathode ray tube 37, in the manner of a known flying spot scanner. Positioned between the screen 36 of the tube 37 and the photoelectric cell 34 is a photographic code carrier or scrambling slide 38 upon which are recorded a plurality of concentric scrambling signal tracks scanned by the rotating fluorescent light spot of the tube. The spot is produced in a known manner by rotating the electron beam in a manner well known in the art. As mentioned, a plurality of scrambling tracks may be applied to the carrier 38 along different concentric circles, thus providing an unlimited possibility of varying the scrambling key, to prevent decoding or deciphering of a message by unauthorized listeners.

In order to successively vary the scrambling key or sequence of the scrambling tracks, that is, to change from one to the other of the tracks upon the slide or carrier 38, the tube, in addition to its regular deflecting plates 39 and 39', has an additional pair of conically shaped deflecting electrodes 40 and 40'. The deflecting electrodes 39' and 40' are grounded in the manner shown and understood. The regular deflecting plates 39 are connected to the output of a generator 42 controlled by the generator 22 through a further frequency changer 41 and producing, by way of an example, an oscillation having a frequency of about 0.1 cycle per second. The frequency changer 41 is connected to the output 22'' of the generator 22, in such a manner as to effect a control of the generator 42 by the master generator 8 both as to frequency and phase. The frequency of the generator 42 determines the speed of rotation of the electron beam and, in turn, of the scanning light spot upon the screen 36. In order to cause the light spot to rotate upon different concentric tracks in accordance with a prearranged program or schedule, the conical deflecting electrode 14 is further connected to a keying generator 44 which is, in turn controlled by the generator 42 through a further step-down frequency transformer 43. The keying generator 44 may be designed in such a manner as to cause the electron beam moving within a conical surface to be deflected from one surface to another at the end of each revolution, in such a manner that the light spot revolving upon concentric circles changes suddenly after each revolution to a different circle and scrambling code, respectively, in accordance with the voltage of the generator 44. The change of the light spot from one track or circle to another is preferably effected while the spot passes through the same track position common to all circles. At this position, the corresponding points of the carrier 38, indicated in the drawing at 45' have approximately the same density, whereby to prevent discontinuities or instability during the change from one to another circle in controlling the wobbling phase shifter 29. According to a practical example, the coding tracks upon the carrier 38 may be applied to an annular surface having an inner diameter of 40 mm. and an outer diameter of 100 mm. in case of a disc-shaped slide code carrier 38. The code signals may be recorded upon the various tracks in a manner well known in sound film recording, that is, either in the form of a variable width or a variable density record, a combination of both, or in any other suitable manner. Since, in the example given, the light spot may have a diameter of about 0.5 mm., each code track may have a width of about 0.7 mm., whereby to result in about 40 tracks which may be scanned in any desired sequence. The resulting number of scanning possibilities amounts thus to 40! ($1\times2\times3\times4 \ldots 40$), whereby to practically insure absolute secrecy of transmission and making it impossible to an unauthorized listener to decipher a message.

In the case of a frequency of 0.1 cycle of the oscillations produced by the generator 42, the time of rotation of the light spot upon one track is about ten seconds, whereby the scanning of all the tracks requires four hundred seconds or about seven minutes. This corresponds to a relatively long message or conversation. During the time of such a message there is, therefore, no repetition of the scrambling key, whereby to enable the transmission of normal messages without changing of the scrambling key.

Fig. 2 illustrates the function of the coding and decoding of the message according to the invention. The circular track upon the storage screen of the tube is shown at 50 upon which track rotates the electron beam as a result of the control of the deflection electrodes by the phase shifters 23, 24, 25 and 29. For simplicity, the beam will be referred to in the following with respect to its instantaneous function as "read-in beam," "read-out beam" or "erasing beam," respectively. Points 46, 47 and 48 represent the spots upon the screen scanned by the various beams at a given instant. In the case of the transmitter, the spot 46 produced by the read-in beam and the spot 48 produced by the erasing beam rotate in the direction of the arrow 49 at a constant speed and at the relative position and closely adjoining each other as shown, that is, the erasing beam 48 slightly leads the recording beam 46, in such a manner as to produce a substantially closed circular track 50 upon the screen of the tube. Assuming temporarily the wobbling phase shifter 29 to be omitted, the spot 47 produced read-out beam would be displaced by about 180° relative to the read-in and erasing beams 46 and 48 and under this condition would rotate at a constant speed along the track 50. The resulting output voltage between the collector 6 and cathode 2 would then represent the clear or undistorted input message. If now, the wobbling phase shifter 29 is connected and controlled according to a prearranged scrambling signal or schedule, the read-out beam 47 will be subject to a wobbling or oscillating motion, preferably to the full extent of the portion of the track 50 between the read-in and erasing beams 46 and 48, respectively, as indicated by the arrows 51 in the drawing. This results in a distortion and scrambling of the speech or other signals delivered by the output of the amplifier 19 and impressed upon the transmitter.

Substantially the same arrangement as shown in Fig. 1 for the transmitter may be used at the receiver with this difference, however, that the incoming scrambled signals are now applied to the input of amplifier 31 and a suitable output device, such as a telephone, loud-speaker etc., is connected to the lead 20. Furthermore, in the case of the receiver, the wobbling phase shifter 29 is connected in the input lead to the phase shifter pair 23, instead of in the input lead of the phase shifter 24, as shown in the drawing, to result in a decoding or unscrambling of the recorded or stored signals upon the screen of the receiving cathode ray tube. By maintaining an exact synchronism between the master generators 8 at the receiver and at the transmitter, the read-out beam at the transmitter and the read-in beam at the receiver are operated synchronously, to result in a coding and corresponding decoding of a message. Furthermore, at the transmitter, the erasing beam 48 advantageously immediately precedes the recording beam 46 in order to enable maximum wobbling or scrambling of the read-in beam or spot 47. In the case of the receiver, on the other hand, the erasing beam advantageously moves immediately behind the read-out beam and at the same speed as the latter, whereby again the same length of track will be available for the wobbling movement and unscrambling of the read-in beam at the receiver, in a manner readily understood from the foregoing.

According to an improved feature of the invention, a further pulse time channel is added to the three pulses produced by the pulse multiplier 12, to cause the electron beam to function successively (*a*) to record the message, (*b*) to reproduce a scrambling record previously recorded upon the same tube inside the track 50, (*c*) to reproduce the stored scrambled message, and (*d*) to erase the record. In a system of this type, the wobbling phase shifter 29 is controlled by the electron beam of the storage tube through a suitable delay network during the time periods, while the beam cyclically scans by way of an additional gating amplifier a coding record recorded upon the screen of the tube 1. Due to the delayed control of the wobbling phase shifter, the subsequent wobbling of the read-out beam is controlled according to the record scanned by the beam. Such a system has the advantage that only a single cathode ray tube is required. At the receiver the recording of the scrambling record transmitted from the transmitter may be effected prior to the recording of the message, that is, prior to the read-in, read-out and erasing periods of the beam.

Difficulties may be experienced in producing a relative low frequency of the order of 0.1 cycle per second by the generator 42. In such a case the movement of the light spot, or alternatively, a corresponding movement of the scrambled record carrier 38, may be effected by mechanical means, such as by the air of an electrical motor synchronized by the master generator 8, in a manner readily understood. In the arrangements described hereinabove, the scrambling record tracks upon the carrier 38 are in the form of concentric circles. As will be understood, the tracks may be in the form of a spiral or linear scanning lines or of any other suitable configuration.

Furthermore, it will be evident that the invention is not limited to the specific type of screen storage tube shown for illustration, and that the basic principle applies equally to other types of image storage tubes well known in the art. Thus a tube known as graphechon tube may be used, such tube being described in further detail in "Fernmeldetechnische Zeitschrift FTZ," April, 1954, page 48. This tube comprises separate cathode rays, each of which is utilized as a read-in, read-out and erasing beam moving upon a common recording track, in the manner pointed out and understood from the foregoing. The use of such a tube eliminates the successive and continuous switching of a single beam between its various functions, in the manner shown and described herein.

As will be understood, when using a single scanning electron beam as shown and described acting successively or re-recording, reproducing and erasing beam, respectively, the recurrence frequency of the respective scanning pulses should be higher than the highest component frequency of the signals or message being transmitted, as is well known from similar pulse time or scrambling transmission methods.

Furthermore, in place of an electron beam scanner, other radiant energy beam devices may be used, such as one or more light beams together with suitable control or deflecting devices.

In the foregoing, the invention has been described with reference to a specific illustrative device. It will be evident, however, that numerous variations and modifications, as well as the substitution of known parts and elements for those shown herein for illustration, may be made without departing from the broader scope of the invention as defined in the appended claims. The specification and drawing are accordingly to be regarded in an illustrative rather than a limiting sense.

I claim:

1. A system for secret electrical transmission of audio messages from a transmitter to a receiver comprising at least one cathode ray storage device at said transmitter and said receiver, respectively, having electrostatic storage means and synchronously operated electron beams moving along closed record tracks, means to record, during a first series of successive cyclically recurring time intervals having a recurrence frequency being high compared with the highest frequency component to be transmitted, an outgoing message at said transmitter and the incoming message at said receiver upon said tracks, further means for moving the electron beams along the same tracks to reproduce, during a second series of subsequent cyclically recurring time intervals interspersed with said first time intervals, the recorded messages by said beams immediately upon recording, means to erase, during a third series of successive cyclically recurring time intervals following and interspersed with said first and second time intervals, the records upon said track immediately upon reproduction thereof, means for synchronously wobbling the electron beams of said devices during the reproducing time intervals at the transmitter and during the recording time intervals at the receiver, to scramble the transmitted message and to unscramble the received message, respectively, said successive recording, reproducing and erasing time intervals being controlled by synchronized master oscillators at said transmitter and receiver, a pulse former controlled by said oscillators at said transmitter and receiver, a pulse former controlled by said oscillators to produce rectangular current pulses, a pulse multiplier controlled by said pulse formers to produce successive groups of three pulses each in predetermined frequency and relative time-phase position to said oscillators, and gating devices each controlled by one of the output pulses of said multipliers and adapted to produce output potentials applied to the screens of said tubes, whereby the electron beams of said tubes successively operate as recording, reproducing and erasing beams, respectively.

2. A system as claimed in claim 1, including deflecting means for said tubes controlled by a plurality of phase-shifting means connected therebetween and said oscillators, to synchronously control the electron beams to move along said tracks as recording, reproducing and erasing beams, respectively, further means to control said phase-shifting means to be successively effective during said first, second and third series of time intervals, respectively, and further scrambling and unscrambling phase-shifting means preceding the last mentioned phase-shifting means operative during the reproducing and recording time intervals of the transmitter and receiver, respectively.

3. A system as claimed in claim 2, including means for generating synchronized scrambling and unscrambling signals at the transmitter and receiver, respectively, and wobbling said phase-shifting means in accordance with said signals.

4. A system as claimed in claim 2, including means to synchronously control said wobbling phase-shifting means comprising scrambling and unscrambling record carriers and reproducing means therefor controlled by said master oscillators at both the transmitter and receiver, respectively, to produce scrambling and unscrambling signals controlling said wobbling phase-shifting means.

5. A system as claimed in claim 2, including means to synchronously control said wobbling phase-shifting means comprising at least one record carrier at the transmitter and receiver, respectively, having a plurality of concentric scrambling and unscrambling record tracks, and reproducing means controlled by said master oscillator to scan said record tracks in predetermined sequence, to produce scrambling and unscrambling signals controlling said further phase-shifting means.

6. In a system as claimed in claim 2, including means to synchronously control said wobbling phase-shifting means comprising at least one record carrier at said transmitter and said receiver, respectively, having a plurality of concentric scrambling and unscrambling record tracks, cathode ray flying spot scanners controlled by said master oscillators, to reproduce one of said record tracks to produce scrambling and unscrambling signals, respectively, controlling said further phase-shifting means, and further deflecting means controlled by said master oscillators to synchronously deflect the beams of said flying spot scanners, to interchange the scrambling and unscrambling record tracks scanned in prearranged relative sequence.

7. A system for secretly electrically transmitting messages from a transmitter to a receiver comprising at least one cathode ray storage tube at said transmitter and said receiver, respectively, means for recording an outgoing message at said transmitter and the incoming message at said receiver upon a record track upon the screens of said tubes, respectively, further means for moving an electron beam along the same track to reproduce the recorded messages immediately upon recording, means for synchronously wobbling according to a prearranged schedule the speed of the reproducing beam of one storage tube and the recording beam of the other storage tube, to scramble the transmitted message and to unscramble the received message, respectively, the means for wobbling the speeds of the electron beams of the storage tubes in the transmitter and the receiver including a code track of differential transparency, means for moving a spot of light along said track and a photocell positioned to receive light from said track for producing the electron beam wobbling voltages.

8. A system for secretly electrically transmitting messages from a transmitter to a receiver comprising at least one cathode ray storage tube at said transmitter and said receiver, respectively, means for recording an outgoing message at said transmitter and the incoming message at said receiver upon a record track upon the screens of said tubes, respectively, further means for moving an electron beam along the same track to reproduce the recorded messages immediately upon recording, means for synchronously wobbling according to a prearranged schedule the speed of the reproducing beam of one storage tube and the recording beam of the other storage tube, to scramble the transmitted message and to unscramble the received message, respectively, the means for wobbling the speeds of the electron beams at the transmitter and at the receiver including a cathode ray tube having deflection means connected to said plates for circulating an electron beam in different conical surfaces and deflecting the beam from one conical surface to another after each turn of the electron beam, a plurality of concentric code tracks along the paths of said beam on the screen of said cathode ray tube each having different transparencies, and means for causing the electron beam to jump from one track to a different track according to a pre-set program.

9. A system according to claim 8, wherein the screen of said cathode ray tube is provided with a common path for the jumping of the electron beam from one track to another, the transparencies of the code tracks being substantially equal in the vicinity of said path, whereby discontinuities in the wobbling voltages do not occur during said jumping.

References Cited in the file of this patent

UNITED STATES PATENTS

| | | |
|---|---|---|
| 2,226,508 | Clothier et al. | Dec. 24, 1940 |
| 2,402,058 | Longhren | June 11, 1946 |
| 2,405,252 | Goldsmith | Aug. 6, 1946 |
| 2,658,948 | Wiemer | Nov. 10, 1953 |
| 2,752,415 | Roschke | June 26, 1956 |
| 2,846,497 | Kennedy | Aug. 5, 1958 |